United States Patent
Koreeda et al.

(10) Patent No.: US 10,320,121 B2
(45) Date of Patent: Jun. 11, 2019

(54) CONNECTOR-INCORPORATING PLUG

(71) Applicant: JAPAN AVIATION ELECTRONICS INDUSTRY, LIMITED, Tokyo (JP)

(72) Inventors: Yuichi Koreeda, Tokyo (JP); Naoki Katagiyama, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 15/772,698

(22) PCT Filed: Jul. 22, 2016

(86) PCT No.: PCT/JP2016/071602
§ 371 (c)(1),
(2) Date: May 1, 2018

(87) PCT Pub. No.: WO2017/104156
PCT Pub. Date: Jun. 22, 2017

(65) Prior Publication Data
US 2018/0323543 A1 Nov. 8, 2018

(51) Int. Cl.
*H01R 13/639* (2006.01)
*G02B 6/36* (2006.01)

(52) U.S. Cl.
CPC ............. *H01R 13/639* (2013.01); *G02B 6/36* (2013.01)

(58) Field of Classification Search
CPC .................................................. H01R 13/639
USPC ........................................................ 439/321
See application file for complete search history.

(56) References Cited

U.S. PATENT DOCUMENTS

| D344,449 | S | * | 2/1994 | Ward ............................. D8/395 |
| 5,603,631 | A | * | 2/1997 | Kawahara ............ G02B 6/3893 385/58 |
| D381,894 | S | * | 8/1997 | Lun ............................... D8/396 |
| 6,065,779 | A | * | 5/2000 | Moner .................... B25B 27/10 285/23 |

(Continued)

FOREIGN PATENT DOCUMENTS

| CN | 201891766 U | 7/2011 |
| JP | 06-074382 A | 3/1994 |

(Continued)

OTHER PUBLICATIONS

Official Communication issued in Japan Patent Application No. PCT/JP2016/071602, dated Oct. 11, 2016.

(Continued)

*Primary Examiner* — Alexander Gilman
(74) *Attorney, Agent, or Firm* — Greenblum & Bernstein, P.L.C.

(57) ABSTRACT

A connector-incorporating plug which has a built-in connector in a tube-shaped barrel and in which a coupling is mounted at an outer circumference of the barrel at a front end thereof so as to be movable along a center axis of the barrel includes a C ring mounted, in a detachable manner, in a groove formed on the outer circumference of the barrel and restricting movement of the coupling toward a rear end of the barrel. The C ring is made of a resin material. An outer circumferential side portion of an intermediate portion of a C shape of the C ring protrudes back and forth in the thickness direction thereof to be thick.

6 Claims, 6 Drawing Sheets

(56) References Cited

U.S. PATENT DOCUMENTS

| | | | | |
|---|---|---|---|---|
| 6,604,760 | B2* | 8/2003 | Cresswell | F16L 37/088 285/305 |
| 6,634,679 | B1* | 10/2003 | Stieler | F16L 37/144 285/308 |
| D639,653 | S * | 6/2011 | Kanda | D9/434 |
| 8,398,121 | B2* | 3/2013 | Lotti | F16L 33/227 285/308 |
| D687,702 | S * | 8/2013 | Yates | D8/396 |
| 9,273,812 | B2* | 3/2016 | Bassaco | F16D 25/08 |
| 10,113,676 | B2* | 10/2018 | Bush | F16L 21/06 |
| 2013/0301993 | A1* | 11/2013 | Toda | G02B 6/36 385/76 |
| 2017/0122556 | A1* | 5/2017 | Matsunaga | F23J 13/02 |

FOREIGN PATENT DOCUMENTS

| | | |
|---|---|---|
| JP | 07-287143 A | 10/1995 |
| JP | 2002-040287 A | 2/2002 |
| JP | 2012-141392 A | 7/2012 |
| JP | 2012-197834 A | 10/2012 |
| JP | 2013-235193 A | 11/2013 |
| JP | D1524499 S | 5/2015 |
| TW | D170140 S | 9/2015 |

OTHER PUBLICATIONS

Office Action issued in Japan Counterpart Patent Appl. No. 2015-244223, dated Oct. 4, 2016, along with an english translation thereof.

Office Action issued in Taiwan Counterpart Patent Appl. No. 105133278, dated Apr. 20, 2017, along with an english translation thereof.

Office Action issued in Republic of Korea Counterpart Patent Appl. No. 10-2018-7011633, dated Dec. 28, 2018, along with an English translation thereof.

* cited by examiner

CONNECTOR-INCORPORATING PLUG

TECHNICAL FIELD

The present invention relates to a connector-incorporating plug having a built-in connector.

BACKGROUND ART

Figure 1:
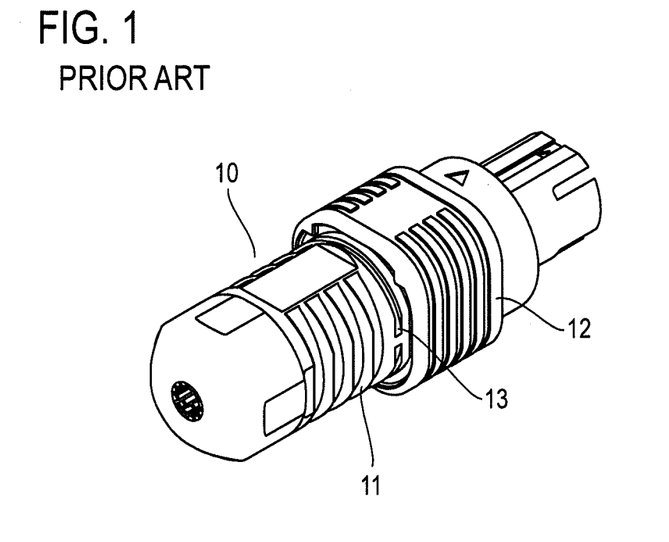
FIG. 1 is a perspective view showing a conventional example of a connector-incorporating plug.

FIG. 1 shows a configuration disclosed in Patent Literature 1 as a conventional example of a connector-incorporating plug 10 of this type. FIG. 1 illustrates a barrel 11 and a coupling 12. The barrel 11 having a tube shape includes a built-in optical connector, although it is hidden in FIG. 1. The coupling 12 is mounted to the outer circumference of the barrel 11 at its front end so as to be movable along the center axis of the barrel 11.

This connector-incorporating plug 10 is of a push-pull connection type. It can be connected to a mating receptacle by grabbing the barrel 11 and pushing it in a single operation, and can also be extracted from the mating receptacle by grabbing the coupling 12 and pulling it backwards in a single operation.

In order to be able to visually check that the coupling goes forward to a predetermined position to make the connector-incorporating plug 10 connect to the mating receptacle, a groove 13 appearing when the coupling 12 goes forward to the predetermined position is formed as a mark on the outer circumference of the barrel 11.

Patent Literature 2 also mentions that a groove appearing when a coupling goes forward to a predetermined position is formed on the outer circumference of a barrel and that it is checked by looking at the groove that the connector-incorporating plug is appropriately connected to a mating receptacle.

PRIOR ART LITERATURE

Patent Literature 1: Japanese Design Registration Gazette No. 1524499
Patent Literature 2: Japanese Patent Application Laid Open No. 2013-235193

SUMMARY OF THE INVENTION

Problems to be Solved by the Invention

A connector-incorporating plug having a built-in optical connector inside a barrel and having a water-proof structure is used, for example, in outside facilities such as base stations for mobile phones. The connector-incorporating plug 10, shown in FIG. 1, is also used for such purposes.

When the connector-incorporating plug 10 is used in a base station for mobile phones, connection work needs to be performed at a high place and, in general, the connector-incorporating plug 10 needs to be directed vertically upward to be connected to a receptacle in the base station. In order to protect the connector-incorporating plug 10 from such an outside use environment and also to surely keep the connection state with the receptacle in the base station, after being connected, the plug 10 is wound with a tape to be protected and secured.

In such tape winding, since the connector-incorporating plug 10 is of a push-pull connection type and is connected while being directed upward, as described above, it may easily happen that a force is applied downward to the plug 10 during tape winding to accidentally pull the coupling 12, causing the plug 10 to be tape-wound in an incomplete connection state.

Figure 2A:
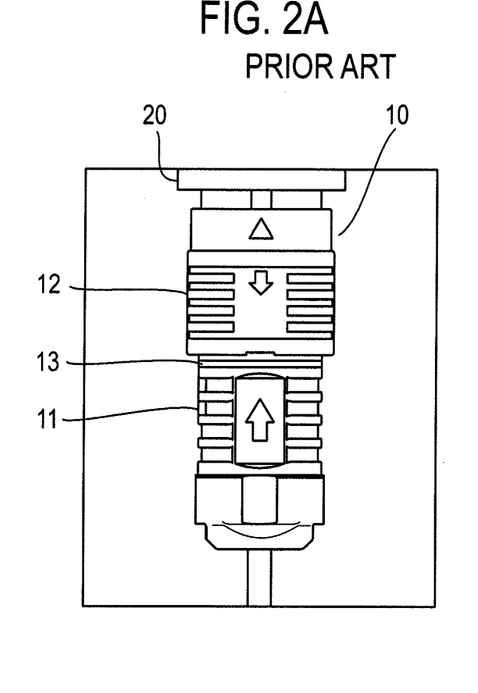
FIG. 2A is a view showing a state in which the connector-incorporating plug shown in FIG. 1 is connected to a receptacle.
Figure 2B:
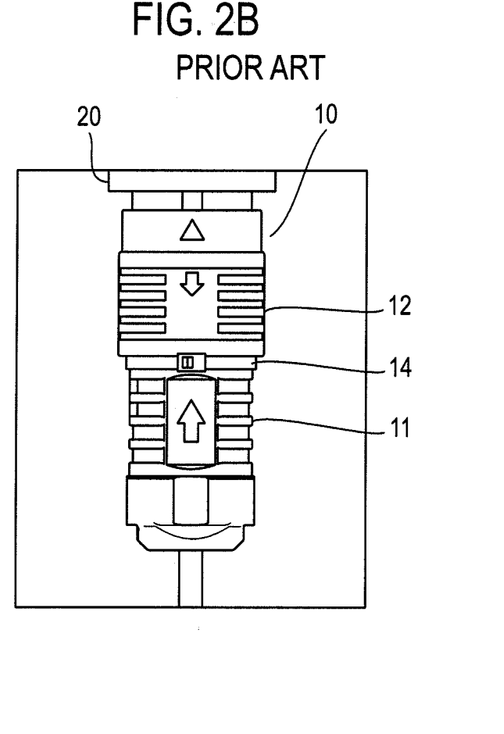
FIG. 2B is a view showing a state in which a binding band is attached to the connector-incorporating plug shown in FIG. 2A.

Therefore, what is conventionally performed is that, after the connector-incorporating plug 10 is connected to a receptacle 20 in the base station, as shown in FIG. 2A, a binding band 14 is mounted to the groove 13 formed on the barrel 11, as a mark, to restrict the movement of the coupling 12.

Figure 3:
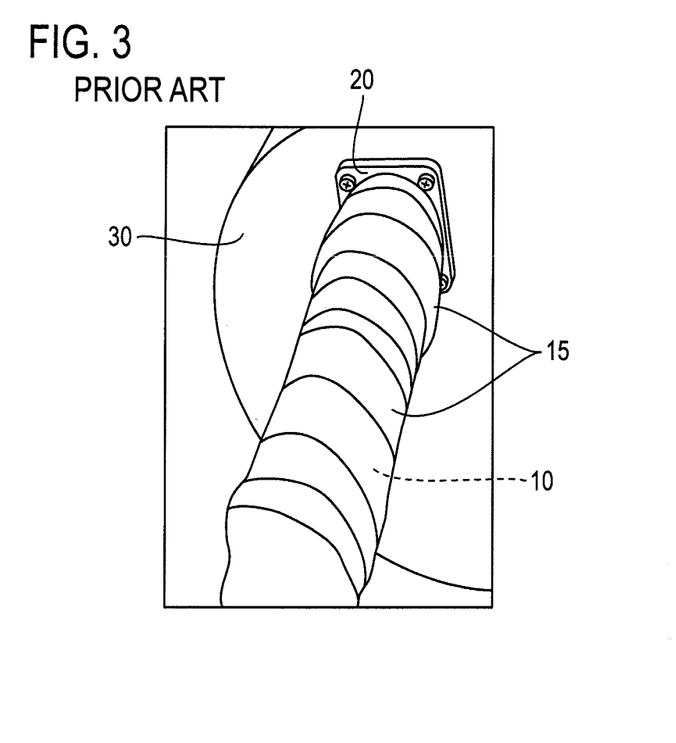
FIG. 3 is a view showing a state in which the connector-incorporating plug connected to a receptacle of a base station is wound with tape.

FIG. 3 shows a state in which, after the movement of the coupling 12 is restricted by the binding band 14, the connector-incorporating plug 10 is tape-wound. FIG. 3 illustrates a wound tape 15 and a base station 13. The receptacle 20 is mounted to the bottom surface of the base station 13.

When the binding band 14 is mounted at a position close to the rear end of the coupling 12, the movement of the coupling 12 is restricted. However, mounting work of the binding band 14 at a high place is troublesome, and in addition, when the connector-incorporating plug 10 needs to be disconnected from the receptacle 20, the binding band 14 needs to be removed, but this removal task is not easy.

An object of the present invention is to provide a connector-incorporating plug in which the movement of the coupling can be easily restricted and the restriction can also be easily released.

Means to Solve the Problems

According to the present invention, a connector-incorporating plug which has a built-in connector in a tube-shaped barrel and in which a coupling is mounted to an outer circumference of the barrel at a front end thereof so as to be movable along a center axis of the barrel includes a C ring mounted, in a detachable manner, in a groove formed on the outer circumference of the barrel and restricting movement of the coupling toward a rear end of the barrel. The C ring is made of a resin material. An outer circumferential side portion of an intermediate portion of a C shape of the C ring protrudes back and forth in the thickness direction thereof to be thick.

Effects of the Invention

With a connector-incorporating plug according to the present invention, the movement of the coupling is easily restricted with the C ring and the restriction can also be easily released.

Therefore, when a connector-incorporating plug is used, for example, in an outdoor facility, such as a base station for mobile phones, and when the connector-incorporating plug is wound with tape to be protected and secured in order to protect the connector-incorporating plug from the outdoor use environment and to surely maintain the connection state with a mating receptacle, it is more simple to perform work for preventing the coupling from being accidentally pulled to make an incomplete connection state happen, compared with conventional work using a binding band.

DETAILED DESCRIPTION OF THE EMBODIMENTS

Now, an embodiment of the present invention will be described.

Figure 4A:
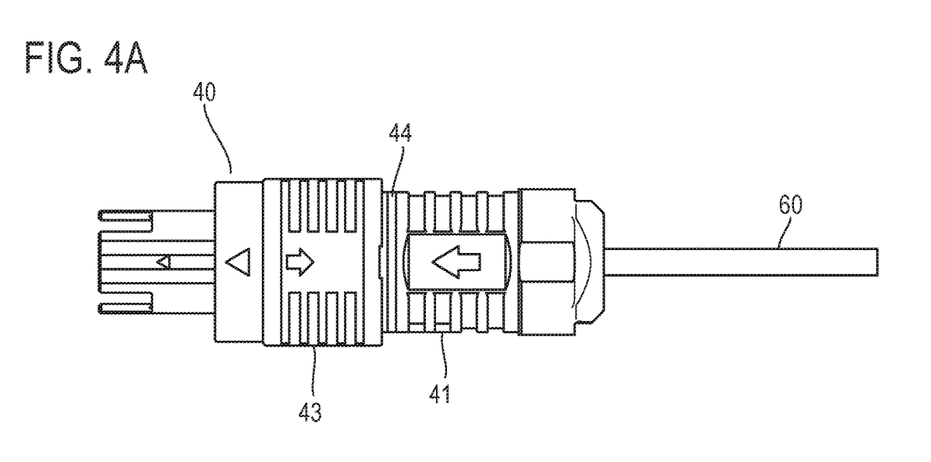
FIG. 4A is a plan showing a state in which a C ring is not mounted to a connector-incorporating plug according to one embodiment of the present invention.
Figure 4B:
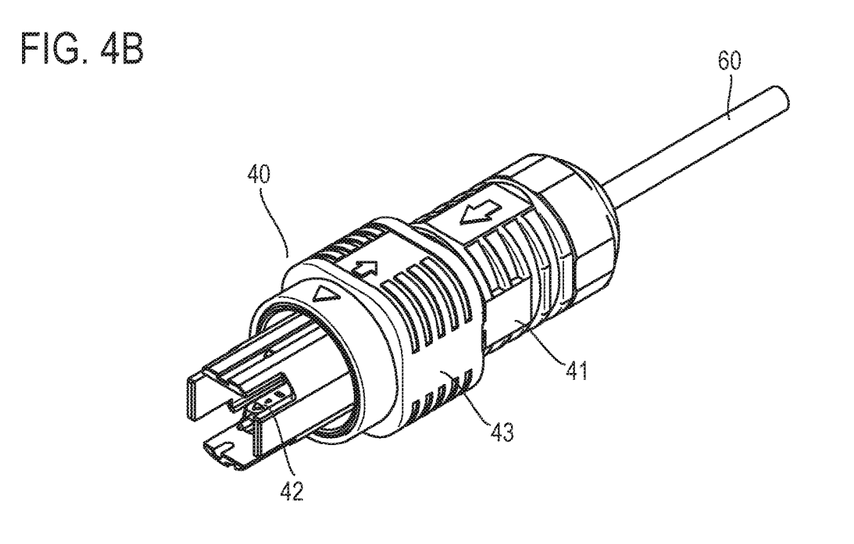
FIG. 4B is a perspective view showing the state in which a C ring is not mounted to the connector-incorporating plug according to one embodiment of the present invention.

FIGS. 4A and 4B show a connector-incorporating plug 40 which has a built-in optical connector 42 in a tube-shaped barrel 41 and in which a coupling 43 is mounted to the outer circumference of the barrel 41 at its front end so as to be movable along the center axis of the barrel 41. In this embodiment, the connector-incorporating plug 40 is provided with a C ring 50 that restricts the movement of the coupling 43, although the C ring 50 is not shown in FIGS. 4A and 4B. The structures of the barrel 41, the coupling 43, and the other components are the same as in the connector-incorporating plug 10 shown in FIG. 1. The connector-incorporating plug 40 is of a push-pull connection type. FIGS. 4A and 4B also show an optical cable 60.

Figure 5A:
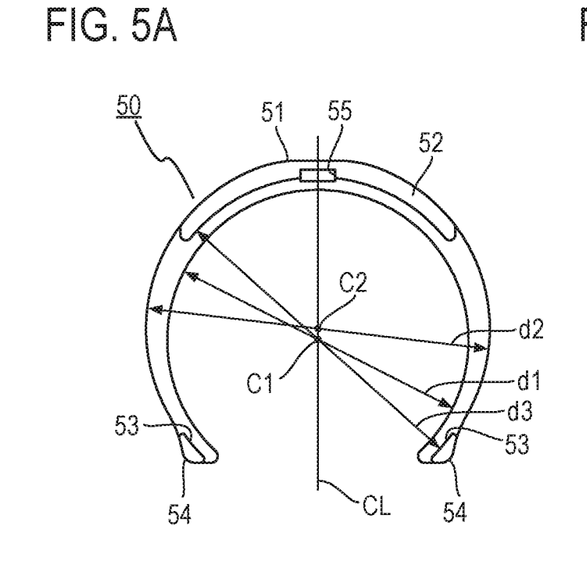
FIG. 5A is a front view of a C ring provided for the connector-incorporating plug according to one embodiment of the present invention.
Figure 5B:
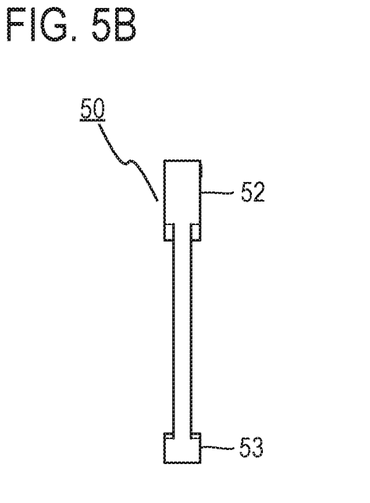
FIG. 5B is a side view of the C ring shown in FIG. 5A.
Figure 5C:
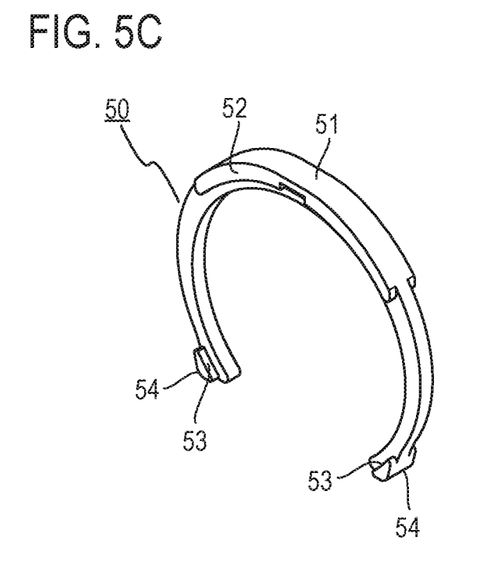
FIG. 5C is a perspective view of the C ring shown in FIG. 5A.
Figure 5D:
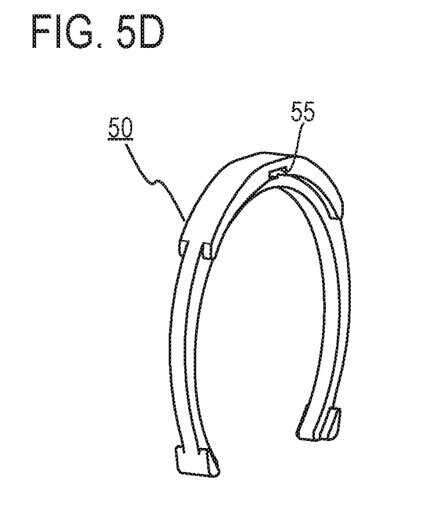
FIG. 5D is a perspective view of the C ring shown in FIG. 5A.

The C ring 50 has a shape shown in FIGS. 5A to 5D. The C ring 50 has 2-fold symmetry with respect to the center line CL passing through the center C1 of the circular arc forming the inner circumference and the center of an intermediate portion 51 of the C shape. The center C2 of the circular arc forming the outer circumference of the C ring 50 is shifted toward the center of the intermediate portion 51 along the center line CL, from the center C1 of the circular arc forming the inner circumference. Therefore, the width of the C ring 50 is gradually reduced from the center of the intermediate portion 51 toward both ends of the C shape. In FIG. 5A, the C ring 50 has an inside diameter d1 and an outside diameter d2.

As described above, the width of the C ring 50 is gradually reduced from the center of the intermediate portion 51 toward both ends of the C ring 50. In addition, the outer circumferential side portion 52 of the intermediate portion 51 and the outer circumferential side portions 53 of both ends of the C shape protrude back and forth in the thickness direction so as to be thick. Protrusions 54 are formed to protrude from the outer circumference surface of the C ring 50 at the outer circumferential side portions 53 where thicknesses of both ends of the C shape are made to be thick. The thicknesses of the protrusions 54 are the same as those of the outer circumferential portions 53.

The outer circumferential side portion 52, where thickness of the intermediate portion 51 is made to be thick, has a through hole 55 passing therethrough in the thickness direction. The through hole 55 has a rectangular shape and is located on the center line CL and slightly on a thin inner circumferential side portion.

The outer circumferential side portion 52 of the intermediate portion 51 and the outer circumferential side portions 53 of both ends of the C shape, which are made to be thick, have inner circumferences forming circular arcs on the same circumference having the center C1 serving as the center of the circle. FIG. 5A also shows the inner diameter d3 of the outer circumferential side portions 52 and 53, which are thick.

The C ring 50, having the above-described shape, is made of a resin material. The C ring 50 is mounted, in a detachable manner, in a groove 44 formed on the outer circumference of the barrel 41. When the C ring is mounted to the groove 44, the coupling 43 is prevented from moving toward the rear end of the barrel 41.

Figure 6A:
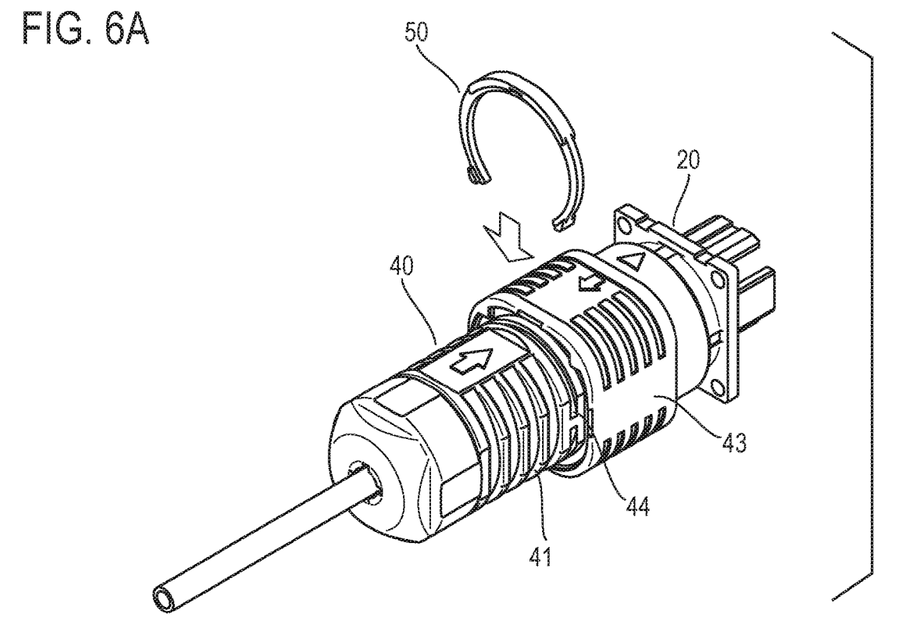
FIG. 6A is a perspective view showing a state in which a C ring is to be mounted to the connector-incorporating plug connected to a mating receptacle.
Figure 6B:
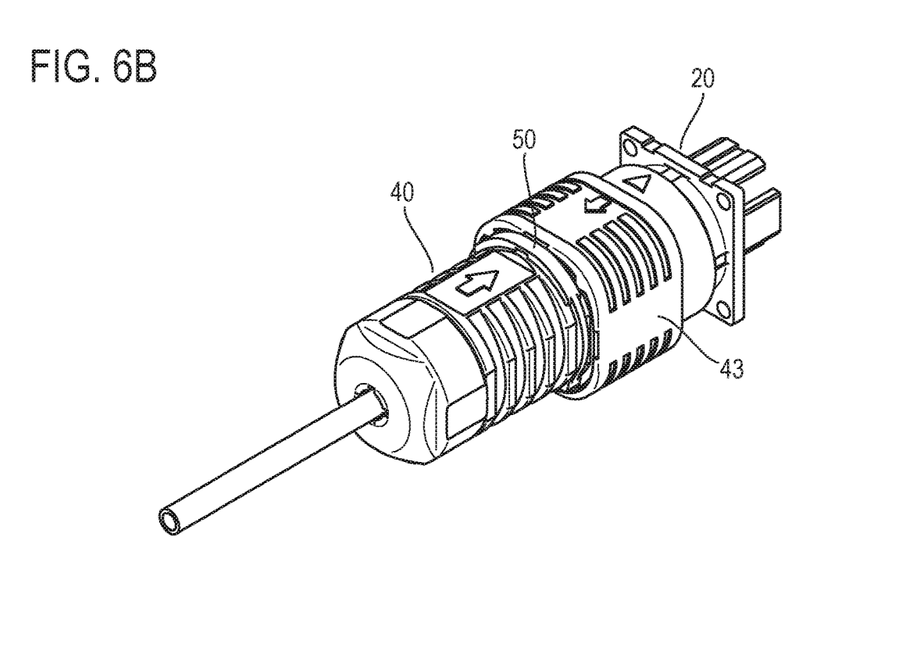
FIG. 6B is a perspective view showing a state in which the C ring has been mounted to the connector-incorporating plug connected to the mating receptacle.
Figure 7A:
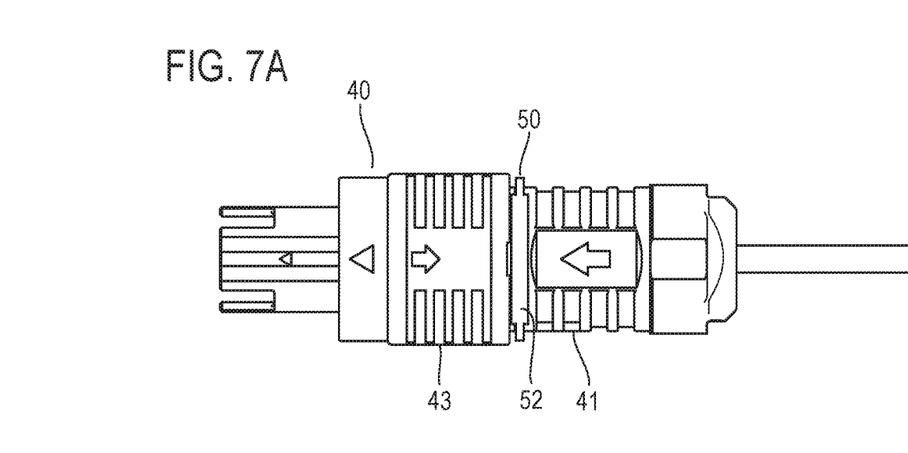
FIG. 7A is a plan showing the connector-incorporating plug according to one embodiment of the present invention.
Figure 7B:
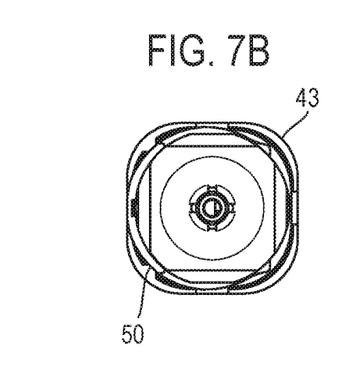
FIG. 7B is a side view of the connector-incorporating plug shown in FIG. 7A.
Figure 7C:
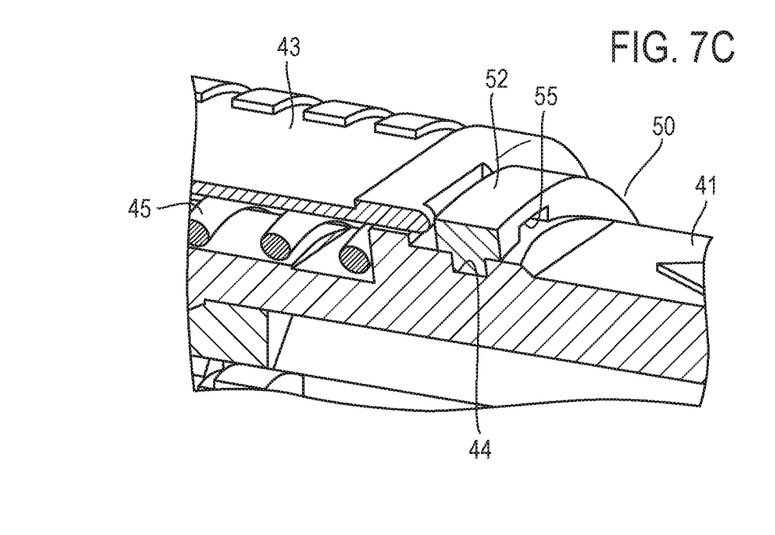
FIG. 7C is a partially-enlarged, cross-sectional, perspective view of the connector-incorporating plug shown in FIG. 7A.

FIG. 6A shows a state in which the C ring 50 is to be mounted to the connector-incorporating plug 40 connected to a mating receptacle 20. The groove 44, which appears when the coupling 43 is moved forward to a predetermined position, is formed on the outer circumference of the barrel 41. The C ring 50 is inserted into the groove 44. FIG. 6B and FIGS. 7A to 7C show a state in which the C ring 50 has been mounted in the groove 44 of the barrel 41. FIG. 7C shows a coil spring 45 that pushes the coupling 43 forward.

The inside diameter d3 of the outer circumferential side portions 52 and 53 of the C ring 50, which are made to be thick, correspond to the outside diameter of the barrel 41, so that these outer circumferential side portions 52 and 53 do not fit into the groove 44 but are located on the outer circumferential surface of the barrel 41. The rear end of the coupling 43 is held by the thick outer circumferential side portion 52 of the intermediate portion 51 of the C ring 50, restricting the movement of the coupling 43 toward the read end of the barrel 41. The size of the C ring 50 is selected such that it does not protrude from the outer circumferential surface of the coupling 43 toward the outside.

As described above, in this embodiment, the C ring 50 restricts the movement of the coupling 43 toward the rear end of the barrel 41. Therefore, when the connector-incorporating plug 40 is used outside, such as for a base station for mobile phones, and when the connector-incorporating plug 40 is wound with tape, as described before, in order to protect the connector-incorporating plug 40 from the outdoor use environment and to reliably maintain the connection state with a mating receptacle, the connector-incorporating plug 40 is prevented from being wound with tape in an incomplete connection state in which the coupling 43 is shifted from a predetermined position due to accidental pulling of the coupling 43.

As explained above, in this embodiment, the C ring 50 is used to restrict the movement of the coupling 43, instead of a binding band which is conventionally used. Using the C ring 50, made of a resin material and having the shape shown in FIGS. 5A to 5D, provides the following features and advantages.

1. It is easy to mount and easy to unmount, compared with a binding band.

2. It is easy to handle because the outer circumferential side portion 52 of the intermediate portion 51 is thick. In addition, it is easy to mount because the distance between both ends (the length of the opening of the C shape) is extended as shown in FIG. 5A, compared with a general C ring.

3. It is easy to widen both ends with the fingers, and also it is easy to unmount it with the fingers because the outer circumferential side portions 53 of both ends are thick and the protrusions 54 are also integrally formed.

4. It is light because it is made of a resin material. Even if it is accidentally dropped during work at a high place and hits someone, for example, the degree of danger is extremely low and safety is provided.

5. It can be produced at low cost because it is made of resin.

6. It is easy to insert it into the groove 44 because the C ring 50 is thin except the outer circumferential side portions 52 and 53 which are made to be thick. In addition, required elasticity can be obtained.

7. The outer circumferential side portion 52, which is thick, eliminates unsteady mounting of the coupling 43.

8. It has improved strength because the intermediate portion 51 is widened.

9. It is easy to mount it without paying attention to the orientation (the back and front) because it has 2-fold symmetry with respect to the center line CL serving as a rotation axis, so that the back and front have the same shape.

10. Because the through hole 55 is provided, it is easy to unmount the C ring by inserting the tip of a screwdriver, for example, into the through hole 55.

A connector-incorporating plug provided with a C ring according to the present invention has been described. The built-in connector is not limited to an optical connector and may be an electrical connector, for example.

What is claimed is:

1. A connector-incorporating plug comprising:
   a tubular barrel;
   a connector housed in the tubular barrel;
   a coupling mounted to an outer circumferential portion of the tubular barrel and movable in an axial direction of the tubular barrel; and
   a C-shaped resin attachment mountable to and removable from a groove formed on the outer circumferential portion of the tubular barrel and when mounted to the groove, restricting movement of the coupling in the axial direction of the tubular barrel,
   wherein
   the C-shaped resin attachment has a portion except for a first outer rim at
   an intermediate portion of the C-shaped resin attachment and second outer rims at both end portions of the C-shaped resin attachment, the portion being thinner than the first and second outer rims in a thickness direction of the C-shaped resin attachment.

2. The connector-incorporating plug according to claim 1, wherein a center of a circular arc including an outer circumference of the C-shaped resin attachment is nearer to a center of the intermediate portion than a center of a circular arc including an inner circumference of the C-shaped resin attachment is.

3. The connector-incorporating plug according to claim 2, wherein the C-shaped resin attachment has 2-fold symmetry with respect to a center line, serving as a rotation axis, passing through the center of the circular arc including the inner circumference and the center of the intermediate portion.

4. The connector-incorporating plug according to claim 1, wherein the C-shaped resin attachment has 2-fold symmetry with respect to a center line, serving as a rotation axis, passing through a center of a circular arc including an inner circumference of the C-shaped resin attachment and a center of the intermediate portion.

5. The connector-incorporating plug according to claim 1, wherein the C-shaped resin attachment has a through hole at the first outer rim, the through hole penetrating in the thickness direction.

6. The connector-incorporating plug according to claim 1, wherein the connector is an optical connector.

* * * * *

UNITED STATES PATENT AND TRADEMARK OFFICE
CERTIFICATE OF CORRECTION

PATENT NO. : 10,320,121 B2
APPLICATION NO. : 15/772698
DATED : June 11, 2019
INVENTOR(S) : Koreeda et al.

Page 1 of 1

It is certified that error appears in the above-identified patent and that said Letters Patent is hereby corrected as shown below:

On the Title Page

Column 1, after item (65), insert:
-- (30) Foreign Application Priority Data
Dec. 15, 2015 (JP) ..................... 2015-244223 --

Signed and Sealed this
Nineteenth Day of November, 2019

Andrei Iancu
*Director of the United States Patent and Trademark Office*